H. J. JOHN.
FILLING FOR RUBBER TIRES AND THE LIKE.
APPLICATION FILED AUG. 26, 1907.
906,633.
Patented Dec. 15, 1908.
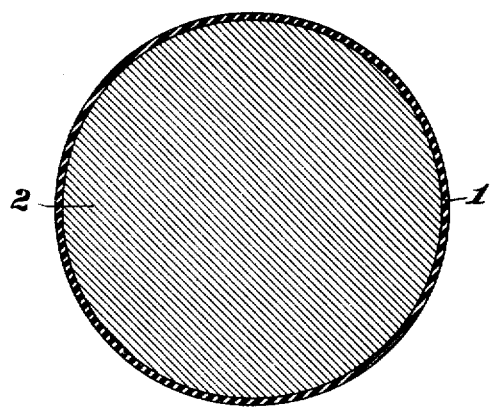
WITNESSES.
INVENTOR,
Harry Joseph John,
By Ray, Totten Winter,
His Attys.

UNITED STATES PATENT OFFICE.

HARRY JOSEPH JOHN, OF WASHINGTON, PENNSYLVANIA, ASSIGNOR OF ONE-HALF TO LOUIS RAPHAEL, OF PITTSBURG, PENNSYLVANIA.

FILLING FOR RUBBER TIRES AND THE LIKE.

No. 906,633.     Specification of Letters Patent.     Patented Dec. 15, 1908.

Application filed August 26, 1907. Serial No. 390,180.

*To all whom it may concern:*

Be it known that I, HARRY JOSEPH JOHN, a resident of Washington, in the county of Washington and State of Pennsylvania, have invented a new and useful Improvement in Filling for Rubber Tires and the Like; and I do hereby declare the following to be a full, clear, and exact description thereof.

This invention relates to a composition for filling hollow rubber and similar bodies, such as rubber tires for all sorts of vehicles, cushions, and the like.

The object of the invention is to provide a composition which is insoluble, non-decomposable, and which has all of the elasticity and yielding qualities of compressed air and which avoids the expense and inconvenience occasioned by leakage or punctures which are encountered in the use of compressed air in tires, cushions and the like.

The accompanying drawing is a cross section of a rubber tire filled with my composition, the tire being shown at 1 and the composition filling at 2, the latter entirely filling the tire.

The composition which I use is made up in the following manner. I take, for instance, 42 parts of water and 24 parts of glycerin, by weight, and mix the same, and also add some coloring matter to give a distinguishing color to the composition, such as a red or pink color, to serve as a mark to indicate the origin of the goods, such coloring matter being added until the desired shade is obtained. To this liquid I add 24 parts by weight of commercial gelatin glue. I then allow the same to stand until the gelatin is thoroughly softened, which will take from 12 to 24 hours according to conditions. The composition so formed will set but only slowly, and furthermore, is soluble either by water or by heat and therefore not wholly desirable for my purpose as the same would leak out in case of puncture of the tire or other casing. In order to render the same insoluble I add to each 6 pounds of the composition above described the following solution, namely:

Formaldehyde ............ 1 oz.
Oxalic acid ............... 1 "
Hot water ................ 12 "

The formaldehyde has the property of causing the gelatin composition to set. The action is so rapid that it would not permit the filling of the composition into the tire before setting. The oxalic acid retards the setting property of the gelatin, holding the same in solution for about an hour, thus enabling the tire to be filled, and also acts as a preservative for the gelatin. The solution of formaldehyde and oxalic acid is added to the composition just before filling the same into the tire, cushion or other casing.

In practice the composition of glycerin and gelatin is first made up, and when it is to be used is placed on a water bath in order to liquefy the same. The solution of formaldehyde and oxalic acid is then added to the composition, which is immediately pumped or otherwise filled into the tire, cushion or other casing. In about an hour's time it is fully set and the article is ready for use.

The hardness of the composition can be varied by varying the proportions of either glycerin or gelatin glue, or both. The proportions above given are merely one example of those which may be used. By increasing the proportion of glycerin the composition when set becomes softer and by decreasing the glycerin the composition becomes harder. So, too, by decreasing the proportion of gelatin glue the composition becomes softer, while by increasing the gelatin the composition becomes harder. The hardness, therefore, can be regulated by varying the proportions of either the glycerin or of the gelatin glue, or both.

The composition when set is insoluble and non-decomposable and is as elastic, flexible and yielding as a very soft grade of sponge rubber. When used as a filling for the inner tube of tires for motor cars it acts in all particulars the same as though the tube were filled with compressed air, no difference being noticeable in the ease of riding of the car. The coloring matter may, of course, be entirely omitted, but I prefer to add it as it serves as a trade-mark to indicate the origin of the goods. The proportions of the ingredients can be materially modified as above indicated and equivalents may be employed.

What I claim is:—

A composition for tires, cushions and the like, consisting of a gelatinous compound, a softening agent therefor, formaldehyde, and oxalic acid.

In testimony whereof, I, the said HARRY JOSEPH JOHN, have hereunto set my hand.

HARRY JOSEPH JOHN.

Witnesses:
JAMES A. MAGILL,
J. CARTER JUDSON.